United States Patent [19]

Matsumoto et al.

[11] Patent Number: 4,911,733

[45] Date of Patent: Mar. 27, 1990

[54] PROCESS FOR FABRICATING COLOR FILTERS

[75] Inventors: Kazuya Matsumoto, Yokohama; Hisashi Nakatsui; Hiroyuki Imataki, both of Kawasaki, all of Japan

[73] Assignee: Canon Kabushiki Kaisha, Tokyo, Japan

[21] Appl. No.: 561,136

[22] Filed: Dec. 13, 1983

Related U.S. Application Data

[63] Continuation of Ser. No. 312,052, Oct. 16, 1981, abandoned, which is a continuation of Ser. No. 161,497, Jun. 20, 1980, abandoned.

[30] Foreign Application Priority Data

Jun. 20, 1979 [JP] Japan .................................. 54-77799
Jun. 26, 1979 [JP] Japan .................................. 54-80305

[51] Int. Cl.[4] .......................... D06P 1/02; B44C 1/16; G01N 21/00; A21K 27/03

[52] U.S. Cl. ........................................ 8/471; 156/234; 250/491.1; 250/492.1; 353/84; 427/166

[58] Field of Search ............... 156/230, 234, 235, 237, 156/238, 239, 249, 272, 273; 8/471; 250/491.1, 492.2; 353/84, 97; 350/311, 313, 314, 316, 317; 354/102; 430/5, 9, 24; 427/43.1, 53.1, 55, 166, 255.1, 255.7

[56] References Cited

U.S. PATENT DOCUMENTS

| | | | |
|---|---|---|---|
| 3,210,544 | 10/1965 | Marx, Jr. et al. | 430/201 |
| 3,378,636 | 4/1968 | Hamilton | 350/311 |
| 3,653,903 | 4/1972 | Nihyakumen et al. | 430/141 |
| 3,655,379 | 4/1972 | Gundlach | 250/315.1 |
| 3,663,221 | 5/1972 | Higgins et al. | 430/7 |
| 3,745,586 | 7/1973 | Braudy | 101/471 |
| 3,771,872 | 11/1972 | Nightingale | 430/5 |
| 3,885,877 | 5/1975 | Horwath et al. | 430/5 |
| 3,948,661 | 4/1972 | Nihyakumen et al. | 430/149 |
| 3,981,730 | 9/1976 | Takahashi et al. | 250/318 |
| 4,081,277 | 3/1978 | Brault et al. | 430/200 |
| 4,119,374 | 10/1978 | Mehl et al. | 355/32 |
| 4,196,009 | 4/1980 | Martin | 350/311 |

FOREIGN PATENT DOCUMENTS

| | | |
|---|---|---|
| 36019 | 9/1977 | Japan . |
| 975804 | 11/1964 | United Kingdom . |

OTHER PUBLICATIONS

IEEE Journal, vol. SC-13, No. 1, pp. 23-27, 2/78.

*Primary Examiner*—Michael W. Ball
*Assistant Examiner*—L. Falasco
*Attorney, Agent, or Firm*—Fitzpatrick, Cella, Harper & Scinto

[57] ABSTRACT

A process for fabricating a color filter comprising a support and a color element layer comprises irradiating a coloring matter with an energy ray modulated by a pattern mask to melt or sublime the coloring matter and applying selectively the coloring matter to the support corresponding to the modulation to form the color element layer.

11 Claims, 5 Drawing Sheets

PROCESS FOR FABRICATING COLOR FILTERS

This application is a continuation of application Ser. No. 312,052 filed Oct. 16, 181 now abandoned, which was a continuation of application Ser. No. 161,497, filed June 20, 1980, now abandoned.

BACKGROUND OF THE INVENTION

1. Field of the Invention

This invention relates to a process for fabricating a color filter.

2. Description of the Prior Art

A color filter is widely used as a color plate for limiting oblique luminous flux, a color face plate for Braun tube display, a plate for photoelectric transducer for copying, a filter for color television camera of a single tube type and the like.

In particular, as a technique for producing semiconductors has recently developed, a solid pickup element has been used as an element for converting two dimensional images to electric signals in place of conventional pickup tube. For example, a solid pickup element called "CD" (charge coupled device) or "BBD" (bucket brigade device) contains a great number of finely divided light receiving portion and a driving circuit for taking out information from the light receiving portion in one chip, and for picking up color images, a color filter corresponding to the surface of the finely divided light receiving portion should be provided.

A color filter used for a solid pickup element and in the other field has been recently demanded which is elaborate and of high resolution and good durability since high resolution of color image and smaller size of a color image converting apparatus are desired.

A color filter is usually a filter where color elements are arranged in a form of mosaic or stripe. As color elements, blue (B), red (R) and green (G) are most often used.

A representative process for fabricating a color filter comprises forming a color element receiving layer by coating a resin such as polyvinyl alcohol, gelatine and the like on a support and applying a coloring matter to the color element receiving layer. For producing each of red, green and blue color elements, a mask is formed on a color element receiving layer usually by using a photoresist and a coloring matter is applied to predetermined portions and then the mask is removed by etching. This procedure should be repeated three times and therefore, the fabricating process is very complicated. In addition, pinholes and defects are liable be formed during the fabrication and it has been desired to produce a color filter free from such drawbacks in good yield.

When a color filter is formed directly on a light receiving element such as a solid pickup element, the formation and removal of the photoresist mask are conducted by a wet treatment and therefore, the light receiving element is liable to be adversely affected by the etching solution.

SUMMARY OF THE INVENTION

An object of the present invention is to provide a process for fabricating a color filter in which it is not necessary to form a mask on a support every time when each color element is formed.

Another object of the present invention is to provide a process for fabricating a color filter in which any wet treatment for forming, a mask is not necessary.

A further object of the present invention is to provide a process for fabricating a color filter which comprises simplified fabricating steps.

Still another object of the present invention is to provide a process for fabricating a color filter of an improved yield of fabrication.

A still further object of the present invention is to provide a process for fabricating a color filter without adversely affecting the support.

Still another object of the present invention is to provide a color filter fabricated by the process as mentioned above.

According to the present invention, there is provided a process for fabricating a color filter comprising a support and a color element layer which comprises:

(a) irradiating a color matter with an energy ray modulated by a pattern mask to melt or sublime the coloring matter and (b) applying selectively the coloring matter to the support corresponding to the modulation to form the color element layer.

According to another aspect of the present invention, there is provided a process for fabricating a color filter having a color element layer on a support which comprises irradiating a color matter with an energy beam modulated by a pattern mask and a monitor beam to melt or sublime the coloring matter and thereby applying selectively the coloring matter onto the support corresponding to said modification to form a color element layer, the modulation by the monitor beam being conducted by scanning the pattern mask with the monitor beam, detecting a reflecting beam of the monitor beam at the pattern mask surface and modulating the energy beam.

According to a further aspect of the present invention, there is provided a process for fabricating a color filter having a color element layer on a support which comprises using a pattern mask having at least two window portions passing or reflecting particular energy rays of different wavelengths, modulating said energy rays by the pattern mask, and thereby applying selectively different coloring matters onto a support by means of the energy rays having different wavelengths to produce a color element layer.

According to still another aspect of the present invention, there is provided a color filter as fabricated by the above mentioned processes.

DESCRIPTION OF THE PREFERRED EMBODIMENTS

In the process for fabricating a color filter according to the present invention, the color element layer is formed by using an energy beam modulated by a pattern mask and therefore, it is not necessary to form directly a mask of photoresist on a surface where a color element layer is formed, and the fabricating steps are simplified and improvement in color separation property of the color filter can be effected.

The formation of the color element layer is effected under dry conditions and therefore, there is not a fear that the support is damaged as under wet condition.

The pattern mask modulating an energy ray is a mask having a pattern corresponding to the arrangement of each color element of the color element layer, and the thermal action of an energy beam passing according to the pattern of mask melts or sublimes a coloring matter to form a color element layer.

Figure 1:
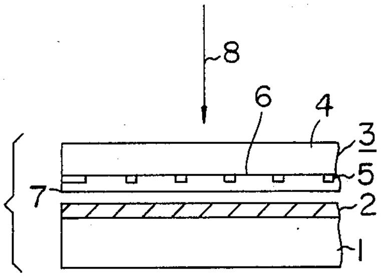
FIG. 1 shows schematically an embodiment of a process for fabricating a color filter according to the present invention.
Figure 2:
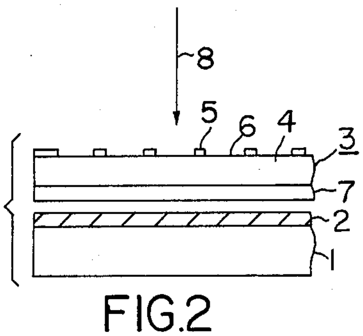
FIG. 2 shows schematically another embodiment of a process for fabricating a color filter according to the present invention.
Figure 3:
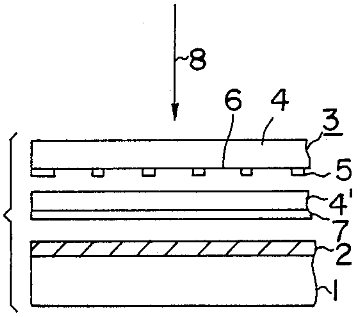
FIG. 3 shows schematically a further embodiment of a process for fabricating a color filter according to the present invention.

Representative embodiments of the process for fabricating a color filter are shown in FIGS. 1–3.

Referring to FIG. 1, there is shown a member composed of a support 1 (CCD and the like) having a patternized light receiving portion and a color element receiving layer 2 on the surface of the support, and further a pattern mask 3 is shown. The pattern mask 3 having a coloring member layer 7 and the member composed of support 1 and the layer 2 are disposed in such a manner that both alignment marks are brought into conformity with each other, and an energy beam 8 is projected resulting in transferring the coloring matter to the color element receiving layer and converting said receiving layer into a color element layer.

The pattern mask has a pattern composed of window portions 6 and intercepting portions 5 on a substrate 4 transparent to the energy beam. An energy beam projected to the pattern mask is intercepted at the intercepting portions and passes through the window portions only and thereby the energy beam having passed through the window portion heats the coloring matter layer 7 to melt or sublime the coloring matter and thereby the coloring matter is applied to the color element receiving layer 2 to produce a color element layer.

The support may be a transparent member such as glass, resin film and the like. When a color filter is formed in such a way that it is integrated with a matter for which the color filter is used, the support is as shown below.

In case of a color face plate for displaying color for displaying a Braun tube, the support is the Braun tube displaying surface.

In case of a single tube type of color television camera, the support is the light receiving surface of the pickup tube.

In case of a color display utilizing a liquid crystal, the support is the glass substrate constructing the liquid crystal cell in a form of matrix.

In case of an electrophotographic photosensitive member for color copying (There is used an electrophotographic photosensitive member composed of a substrate, a photoconductive layer overlying the substrate, and a color filter as an insulating layer overlying the photoconductive layer. The photosensitive member is subjected to an electrophotographic process including a color image exposure to form electrostatic images and developing said electrostatic images to produce color images. For example, Japanese Patent Publication No. 36019/1977 discloses that red (R) light, green (G) light and blue (B) light from a color original pass only "R" portion, "G" portion and "B" portion of a color filter, respectively, and the resistance of the photoconductive layer is reduced depending upon the light amount passing through the filter and projecting to the photoconductive layer and thereby the electrostatic charge present at the corresponding portion disappears. An electrostatic charge at a portion of the photoconductive layer to which a light passing the color filter does not come does not disappear and an electrostatic image is formed. The resulting electrostatic image is developed with a toner capable of intercepting light to adhere the toner to the portion where electrostatic charge remains. Thus the corresponding R portion, G portion and/or B portion of the color filter are covered and thus the color filter portions to which the toner does not adhere form a color image.), the support is an electrophotographic photosensitive member. Further, in case of a solid pickup element, the support is, for example, a silicon substrate (hereinafter such member to which a color filter is applied is called "photosensing element").

A color element receiving layer is a layer for retaining effectively a coloring matter. The representative one is, for example, a layer composed of polyurethane resin, polycarbonate resin, cinnamic acid ester series photosensitive resin or the like resin as shown in "IEEE TRANSACTION ON ELECTRON DEVICES, Vol. ED-25, No. 2, p. 97".

The color element receiving layer is usually thin, in particular, where a high color separation property is required as in case of a solid pickup element, the thickness is usually 5–30 microns, preferably 5–10 microns.

The coloring matter layer is composed of a coloring matter appropriately selected from various coloring matters which melts by heat or sublimes.

As representative coloring matters, there are shown some dyes and pigments below.

(1) Red coloring matter

Celliton Scarlet B (tradename, supplied by Badische Anilin & Soda Fabrik A.G.),

Diacelliton Fast Pink R (tradename, supplied by Mitsubishi Chemical Industries Ltd.), Terasil Brilliant Pink 4BN (tradename, Ciba-Geigy Ltd.), Kayalon Fast Red R (tradename, supplied by Nippon Kayaku Co. Ltd.), Sumikaron Red E-FBL (tradename, supplied by Sumitomo Chemical Co. Ltd.), Resolin Red FB (tradename, supplied by Bayer AG), Rhodamine 6 GCP (tradename, supplied by Sumitomo Chemical Co. Ltd.), Aizen Cathilon Pink FGH (tradename, supplied by Hodogaya Chemical Co. Ltd.), Maxilon Brilliant Red 4G (tradename, supplied by Ciba-Geigy Ltd.), Diacryl Brilliant Pink R-N (tradename, supplied by Mitsubishi Chemical Industries Ltd.) and the like.

(2) Green coloring matter

Aizen Diamond Green GH (tradename, supplied by Hodogaya Chemical Co. Ltd.),

Aizen Malachite green (tradename, supplied by Hodogaya Chemical Co. Ltd.),

Brilliant Green (tradename, supplied by E. I. du Pont de Nemours & Co. Inc.),

Fast Green JJO (tradename, supplied by Ciba-Geigy),

Synacril Green G (tradename, supplied by Imperial Chemical Industries Ltd.),

Victoria Green (tradename, supplied by E. I. du Pont de Nemours & Co. Inc.) and the like.

Green color may be obtained by combining a blue dye and a yellow dye.

(3) Blue coloring matter

Miketon Fast Blue Extra (tradename, supplied by Mitsui-Toatsu Chemicals Inc.),

Kayalon Fast Blue FN (tradename, supplied by Nippon Kayaku Co. Ltd.),

Sumikaron Blue E-BR (tradename, supplied by Sumitomo Chemical Co. Ltd.),

Terasil Blue 2R (tradename, supplied by Ciba-Geigy Ltd.),

Palanil Blue R (tradename, supplied by Badische Anilin & Soda Fabrik A. G.),

Aizen Brilliant Basic Cyanine 6GH (tradename, supplied by Hodogaya Chemical Co. Ltd.), Aizen Cathilon Blue GLH (tradename, supplied by Hodogaya Chemical Co. Ltd.), Cibacet Blue F3R (tradename, supplied by Ciba-Geigy, Ltd.), Diacelliton Fast Brilliant Blue B ( tradename, supplied by Mitsubishi Chemical Industries Ltd.), Dispersol Blue BN (tradename, supplied by Imperial Chemical Industries Ltd.), Resolin Blue FBL (tradename, supplied by Bayer AG), Latyl Blue FRN (tradename, supplied by E. I. du Pont de Nemours & Co. Inc.), Sevron Blue ER (tradename, supplied by E. I. du Pont de Nemours & Co. Inc.), Diacryl Brilliant Blue H2R-N (tradename, supplied by Mitsubishi Chemical Industries Ltd.), and the like.

The coloring matter layer is formed by vapor-deposition, coating, fusing or the like.

The pattern mask is for modulating energy beam and is, for example, composed of a substrate such as glass, plastics and the like, having light intercepting portions composed of a metal such as Cr, Al, Ag, Cu and the like. As a pattern mask, optional optical masks can be used. In particular, chromium (Cr) is preferable since it is durable and its etching is easy.

As energy beam, various rays such as ultraviolet ray, visible light, infrared ray and the like may be used.

Representative sources of energy beam are tungsten lamp, high pressure mercury lamp, super-high pressure mercury lamp, xenon lamp, arc lamp, and various lasers. In particular, laser is a preferable embodiment in the present invention.

As laser, there may be used He-Ne (wavelength: 0.6328 microns), Ar (wavelength: 0.488 microns), He-Cd (wavelength: 0.442 microns), Nd-YAG (wavelength: 1.06 microns), $CO_2$ (wavelength: 10.6 microns), semiconductor (wavelength: 0.8–0.9 microns) and the like.

Projection of energy beam may be effected by scanning a pattern mask surface with a condensed energy beam or blanket exposure of a pattern mask to a non-condensed energy beam without scanning.

In both cases regardless of condensing the beam, the beam is modulated by the pattern mask and application of coloring matter can be selectively effected corresponding to the pattern of the pattern mask.

Figure 4:
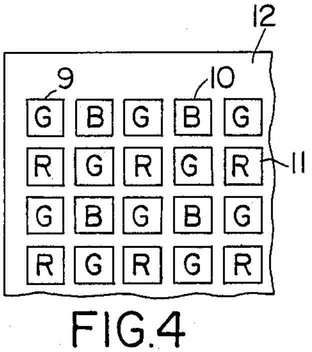
FIG. 4 shows schematically an embodiment of a color filter fabricated according to the present invention.

Application of coloring matter to a color element receiving layer is repeated depending upon the kinds of color elements. For example, a pattern mask provided with a red coloring matter layer is used and an energy beam is projected thereto to adhere the red color element to a color element receiving layer, and then a pattern mask provided with a blue coloring matter layer and a pattern mask provided with a green coloring matter layer are subsequently used and energy beam is projected to produce blue element and green element at the color element receiving layer. As the result, a color element layer 12 capable of acting as a color filter provided with green element 9, blue element 10 and red element 11 is formed on a support as shown in FIG. 4.

Pattern mask of different pattern may be used for forming each color element and also pattern mask of the same pattern may be used in such a manner that the color elements do not overlap each other by positioning the pattern with shift.

Embodiment in FIG. 2 shows a case in which a coloring matter layer 7 is disposed at a side opposite to a light intercepting portion of a pattern mask 3, and the process for fabricating the color element is the same as that in FIG. 1.

In an embodiment of FIG. 3, a coloring matter layer is present between a pattern mask 3 and a support 1, and an energy beam is projected thereto. Coloring matter layer 7 is formed on a substrate 4' which is the same material as substrate 4.

FIG. 1–FIG. 3 show main embodiments of fabrication of a color filter, but the embodiments may be varied if desired. Some variations are as shown below.

The coloring matter layer and the color element receiving layer may be closely positioned, and in addition, may be closely contacted each other followed by irradiation with an energy beam. In particular, in case of adhering a coloring matter to a color element receiving layer by melting, such close contacting disposition is preferred.

Further, in place of forming a coloring matter layer on the pattern mask member, a coloring matter layer may be formed on a color element receiving layer. In this case, the coloring matter layer is formed, for example, by scattering so as to remove easily a coloring matter at a portion other than a region exposed to an energy beam.

The color element receiving layer is used for retaining a coloring matter effectively, and if desired, it may be omitted and a coloring matter is directly disposed on the surface of a support.

It is necessary only that the pattern mask is an optical mask. Therefore, other than masks in FIGS. 1–3 various masks such as a mask lacking the substrate 4, a mask having a light intercepting portions in the substrate.

Figure 5:
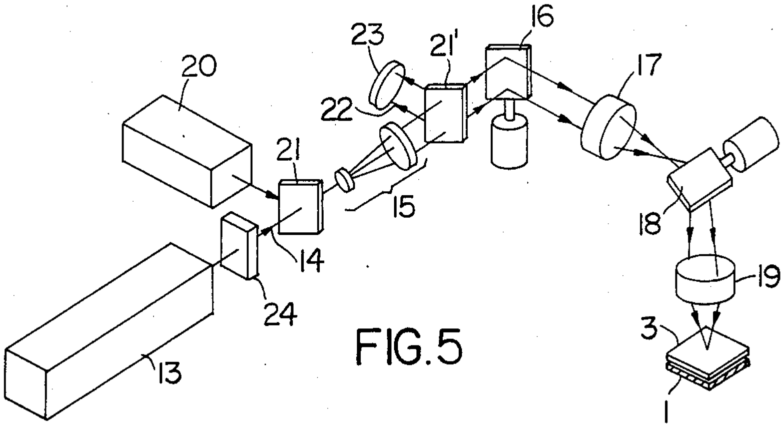
FIG. 5 shows schematically an embodiment of the process for fabricating a color filter by using laser beam according to the present invention.

In the foregoing, typical embodiments of processes for fabricating color filter are explained. Next, an embodiment of a fabricating apparatus including an optical operating system for an energy beam is shown in FIG. 5, which illustrates an example using a laser beam as the energy beam. A laser beam 14 from a laser 13 is diverged or expanded by a beam expanding system 15 and allowed to scan transversely (in the direction of "X") by a first vibration mirror 16. The beam is then transmitted through a lens 17 to a second vibration mirror 18. This lens 17 functions to bring the surfaces of the mirrors 16 and 18 to a conjugation relationship. The beam which is also allowed to scan longitudinally (in the direction of "y") by the second vibration mirror 18 is converged or collected by an image forming lens 19 to form a fine spot on a coloring matter layer which is provided on the back surface of a pattern mask 3. The whole surface of the pattern mask 3 is scanned with that fine spot by appropriate rotation of the vibration mirrors 16 and 18. As a result, a color element layer is formed on a support 1, such as for example a solid pickup element.

In order to achieve the uniform motion of the scanning spot, it is preferable to drive, in a form of the saw tooth wave, the vibration mirrors 16 and 18 and to use a lens having an F-$\theta$ characteristic as the image forming lens 19. As to the relationship between the color element of the color filter and the spot diameter of the laser beam, for example when one color element of the color filter is 30 $\mu\times$30 $\mu$ is size, the above mentioned fine spot is desired to have a diameter of about 30 $\mu$m. However, if the output of the laser is sufficient, the beam spot may be in a rectangular form, for example of about 30 $\mu\times$5 $\mu$, extended in the direction perpendicular to the scanning direction. It is desired to use a light having a wavelength of 5145 or 4880 angstroms from an Ar laser as the laser light source.

If there is a possibility that the pattern mask is damaged in view of the energy intensity of the laser beam, it is preferable to use a mask having as a high reflection factor to the employed laser wavelength as possible. For that purpose, a mask made of a metal may be advantageously employed. Also, the pattern mask can be prevented effectively from being damaged in such a manner that the laser beam is modulated both by the pattern mask and by a monitor beam. The modulation utilizing a monitor beam is carried out by scanning the pattern mask with the monitoring beam and detecting the monitoring beam reflected from the surface of the pattern mask to modulate the energy beam which is applied while overlapped with the monitoring beam.

More particularly, one example of the modulation employing a monitor beam will be described with reference to FIG. 5. A laser beam for monitoring is emitted from a monitor laser 20 having a very small energy and overlapped with the laser beam 14 from the laser 13 by controlling a beam splitter 21 so that both the beams are allowed to scan. At that time, the laser beam 14 is preferably preceded by the monitor laser beam. A reflection beam 22 of the monitoring laser beam from the pattern mask 3 which is reflected by a beam splitter 21' is caught by a light detector 23. In accordance with the signal from the detector, a modulator 24 performs the ON-OFF operation of the laser beam 14 so that only window of the pattern mask may be irradiated with the laser beam 14. In this case, the distance in which the condensing spot of the monitoring laser beam precedes that of the laser beam 14 may be appropriately determined depending upon the response property of the employed modulator and scanning speed with the beam. Usually, the distance may be less than several spots. In a certain case, the monitoring laser beam may be advanced completely in agreement with the laser beam 14 with no difference of the distance.

Figure 6:
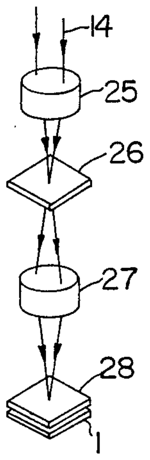
FIG. 6 shows schematically another embodiment of the process for fabricating a color filter by using laser beam according to the present invention.
Figure 7:
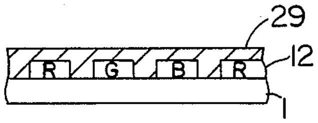
FIG. 7 is another embodiment of a color filter fabricated according to the present invention.

A method of producing a color filter is shown in FIG. 6. In this method, an arrangement including a light condensing lens 25, pattern mask 26, image forming lens 27, coloring matter plate 28 and support 1 is employed in place of an arrangement shown in FIG. 5 including the image forming lens 19, pattern mask 3 and support 1. The coloring matter plate 28 is provided with a coloring matter layer at the surface which is faced with the support. FIG. 6 illustrates one example in which the pattern mask is separated from the coloring matter layer. The laser beam 14 is condensed or collected by the condensing lens 25. The pattern mask 26 is placed at a surface on which the laser beam is to be condensed by the condensing lens 25, and an image of this mask is then transmitted to the surface of the support 1, such as for example a solid pickup element, through the image forming lens 27. After the mask and support are registered with each other, the coloring matter plate 28, for example a glass substrate having thereon a coloring matter film vapor-deposited, is brought into close contact with the support so that the coloring matter is transferred or deposited onto the support.

In registering the mask image with a standard pattern on the support surface, if a glass plate having the same thickness and refractive index as those of the coloring matter plate is brought into close contact with the support surface, the registering can be effected with a higher accuracy. Also in this case, the modulation system using a monitoring laser beam as shown in FIG. 5 can be applied. That is, a monitoring laser beam of a low output is overlapped with the laser beam 14 and allowed to scan, and the reflection light of the monitoring laser beam from the pattern mask 26 is caught by the light detector, and further the intensity of the laser beam 14 is modulated in accordance with the signal from the light detector. Then, only window of the pattern mask is irradiated with the laser beam 14 so that a color element layer is formed on the support. In this case, if the pattern mask 26 and coloring matter plate 28 are somewhat in defocussed state, the monitoring laser beam is focussed on the pattern mask 26, while the laser beam 14 is focussed on the coloring matter plate so that good patterning can be accomplished with high accuracy.

In the present invention, if a pattern mask is used which has windows capable of transmitting or reflecting energy beam of particular wavelength, a color filter of two or more color type can be produced by employing one pattern mask. More particularly, a pattern mask is used which has two or more kinds of window portions each of which passes or reflects an energy ray of a particular wavelength, and the energy rays with differing wavelengths are modulated by the pattern mask, and different coloring matters are deposited onto a support in accordance with the energy rays with differing wavelengths so that a color filter can be fabricated. For example, a color filter of full color type can be fabricated in such a manner that one pattern mask is used and at least three kinds of energy beams having different wavelengths are employed and further at least red, green and blue coloring matters are selectively deposited to the support.

Figure 8:
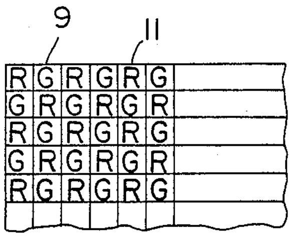
FIG. 8 is a further embodiment of a color filter fabricated according to the present invention.
Figure 9:
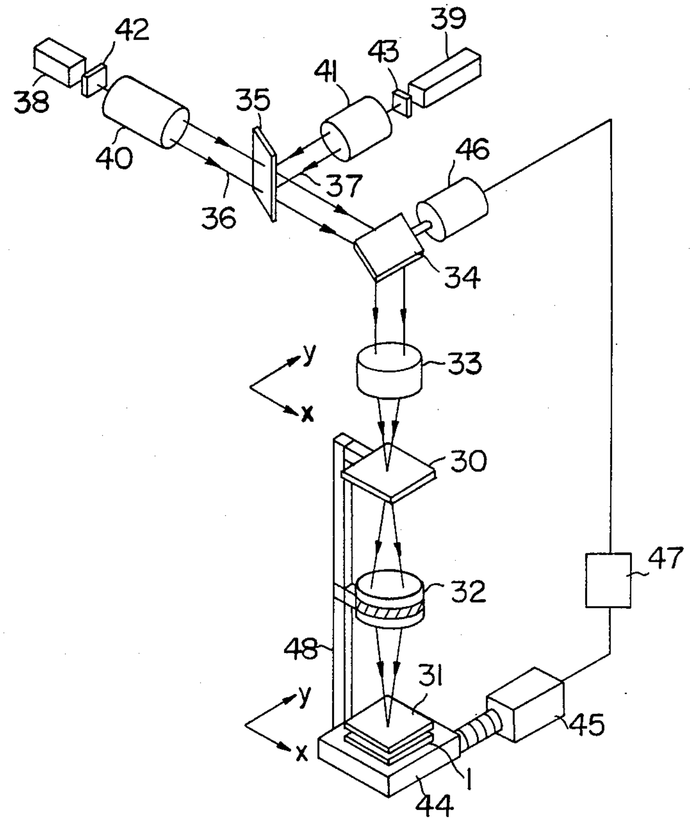
FIG. 9 shows schematically an embodiment of an apparatus and a process for fabricating a color filter according to the present invention.
Figure 10:
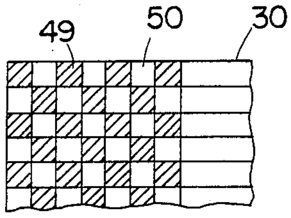
FIG. 10 shows an embodiment of a pattern mask used for the present invention.
Figure 11:
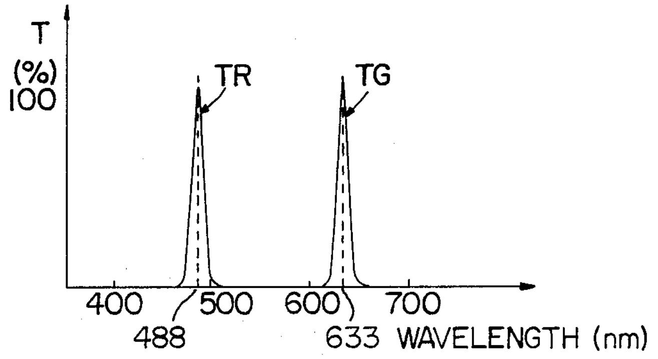
FIG. 11 shows spectral transmittance of each window portion of the pattern mask as illustrated in FIG. 10.
Figure 12:
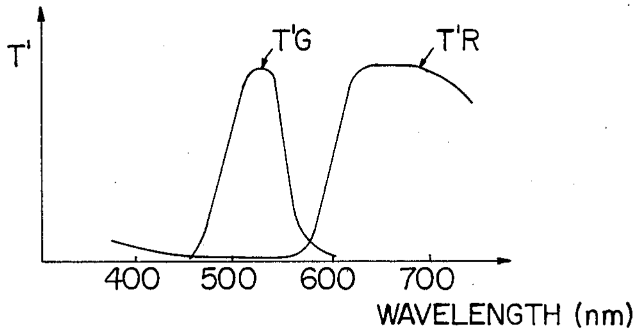
FIG. 12 shows spectral transmittance of dyes.

Fabrication of a color filter by means of the above-mentioned pattern mask will be explained with reference to FIGS. 3–13. At first, explanation is made to a method for producing a color filter having, as fundamental color, two colors, that is, red element "R" and green element "G" arranged as shown in FIG. 8. This method can be easily applied also to production of a color filter having three or more fundamental colors. FIG. 9 illustrates the method and apparatus used therein. An image of a pattern mask 30 is formed in the vicinity of the surface of a support 1 provided with a pickup element such as for example CCD, through an image forming lens system 32. A substrate 31 having red or green, sublimable dye as vapor-deposited on the surface is brought into close contact with the surface of the support 1 with the film of the dye being opposed to the support 1. This substrate is exchanged in the step for transferring red or green dye to the surface of the support 1. As shown in FIG. 10, the pattern mask 30 has a structure in which windows 49 for allowing exposure for forming red color element as well as windows 50 for allowing exposure for forming green color element are arranged in the same fashion as that for the color filter shown in FIG. 1. The pattern mask 30 is registered with the support 1 such as CCD wafer by regulating the respective registering marks so that each window of the pattern mask may be brought into line with the support, for example sensor element of the CCD wafer. Referring to FIG. 9, laser beams emitted separately from an Ar ion laser 38 and an He-Ne laser 39 are controlled by shutters 42 and 43. The respective beams passing through the shutters are expanded to an appropriate beam diameter by beam expanders 40 and 41 and caused to pass through the same path by a dichroic mirror 35 so that they enter into a vibrating mirror 34. The laser beam reflected by the vibrating mirror 34 is condensed or collected by an f-θ lens 33 to form a fine spot on the pattern mask 30. In this example, the light from the Ar ion laser is 488 mm in wavelength and the ocillation wavelength from the He-Ne laser 39 is 633 mm. Correspondingly, the windows 49 and 50 of the pattern mask 30 is formed from a multiple-film interference filter which is designed so that the spectral transmittances T of the windows 49 and 50 may be spectral transmittances TR and TG, respectively, which are 488 mm and 633 mm in the central or top portion of the wavelength and have no overlapping portion as shown in FIG. 11.

Next, the step for transferring the coloring matter will be explained. At first, while the shutter 43 placed in front of the He-Ne laser 39 is brought to light-intercepting state, the shutter 42 is opened so that the parallel laser beam having a wavelength of 488 mm from the Ar ion laser is caused to pass through the dichroic mirror. At that time, the noise light having a wavelength close to that of the He-Ne laser beam is removed by the dichroic mirror. The Ar ion laser beam thus treated forms a fine spot on the pattern mask 30. The spot is swept and deflected in the direction of "x" in the drawing by operating a driving system 46 to rotate the vibrating mirror 34. Since the spot is formed by condensing the beam through the f-θ lens 33, the uniform motion of the vibrating mirror allows scanning of the pattern mask 30 with the spot at uniform velocity. The spot is caused to pass through the pattern mask only when it is deflected to the window 49 for allowing exposure for forming a red color element as shown in FIG. 10 because the windows of the pattern mask 30 have each different spectral transmittances as illustrated in FIG. 10. The spot passing through the pattern mask is transmitted to the image forming lens 32 to form again a fine spot in the vicinity of the surface of the support 1. The window 50 for allowing exposure for forming a green color element completely intercepts the light.

As a result, exposure necessary for forming a red element of the color filter is applied through the imaging lens 32 to a substrate 31 having vapor-deposited dye at the surface, which substrate is brought into close contact with the surface of the support 1. The substrate 31 is prepared by vapor-depositing uniformly a subliable red dye having a spectral transmittance as denoted by "T'R" in FIG. 12. Alternatively, the red dye may be coated on the substrate by the spinner method. When the fine spot formed on the pattern mask passes through the window 49 and condensed onto the substrate 31 by the imaging 32, the red dye irradiated with the spot exhibits a high light absorption coefficient with respect to the Ar ion laser beam having a wavelength of 488 mm as is clear from the spectral transmittance T'R shown in FIG. 12, and therefore the red dye absorbs energy of the laser beam and generates heat and further is sublimated so that it is transferred onto the neighboring surface of the support 1.

In the foregoing, the sweeping of the spot in the direction of "x" in FIG. 9 is carried out by the vibration mirror 34, while the sweeping of the spot in the direction of "y" perpendicular to that of "x" is performed by mechanically moving a stand 44 on which the pattern mask 30, image forming lens system 32, substrate 31 having vapor-deposited dye and support 1, by driving a micrometer 45. The micrometer 45 and system 46 for driving the vibration mirror are controlled synchronously by a controlling system 47 so that the support may be completely scanned with the spot. After formation of the red color element, the above-mentioned substrate 31 is exchanged by a substrate provided with vapor-deposited green dye having a spectral transmittance denoted by "T'G" in FIG. 12 for the purpose of the forming a green color element. The laser beam from the He-Ne laser is caused to enter into the pattern mask by regulating the shutters 42 and 43 and the scanning is conducted in a similar fashion to that mentioned above to form a green color element on the support.

Figure 13:
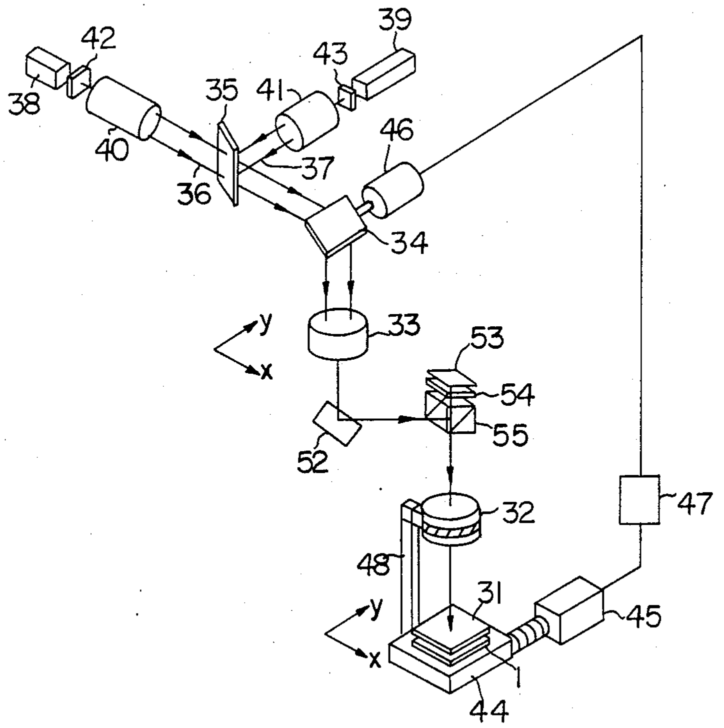
FIG. 13 shows another embodiment of a process and apparatus for fabricating a color filter according to the present invention.

In the example of FIG. 9, a pattern mask of transmitting property is employed. However, a pattern mask having the same reflecting property may also be utilized, and the laser beam from the reflection type pattern mask is condensed onto the support surface so that the scanning and dye transferring operations may be performed. This embodiment is shown in FIG. 13. The apparatus for producing a color filter as shown in FIG. 13 is different from the apparatus shown in FIG. 9 only in the path for the laser beam positioned between the f-θ lens and image forming lens. The laser beam passing through the f-θ lens 33 is reflected by a fixed mirror 52 and enters a polarizing beam splitter 55 so that it may become an S component with respect to the splitter. As a result, almost all of the laser beams entering the splitter pass through a quarter wave plate 54 (for rotating the polarization surface of the ray by 25°) and reflected to the side of a pattern mask 53. The pattern mask 53 functions in the same manner as the pattern mask illustrated in FIG. 10, and therefore the portion corresponding to the window 49 functions to selectively reflect ray of a particular wavelength (for example, ray from the Ar ion laser), and the portion corresponding to the window 50 selectively reflects ray of different particular wavelength (for example, ray from the He-Ne laser). The laser beam reflected by the pattern mask 53 again passes through the quarter wave plate so that the polarization surface of the ray is rotated by 90° in total of going and returning. The ray passes through the polarizing beam splitter 55 and enters the image forming lens system 52. The subsequent operation is carried out in the same manner as that explained in connection with FIG. 9. The pattern mask 53 having a window capable of reflecting a ray of a particular wavelength may be prepared by conventionally adopted method. For example, multiple film coatings of a dielectric substance such as for example $MgF_2$ and $ZrO_2$ are formed on a transparent glass, and each layer is controlled to a predetermined thickness to form a desired window. As mentioned above, a color filter can be fabricated by using a pattern mask provided with a window capable of reflecting a ray of a particular wavelength.

Laser ray other than the foregoing one may be advantageously employed. For example, when the output of the He-Ne laser is insufficient for forming a green color element in the example of FIG. 9, ray of a large output having a wavelength of 1.06 μm from YAG laser can be utilized. In this case, the pattern mask is prepared so that the window 50 for allowing exposure for forming a green color element may have a spectral transmittance of 1.06 μm in the central wavelength.

In fabricating a filter of three color type, i.e. red, green and blue, the red and green color elements are formed in the foregoing manner and the blue color element can be formed by employing ray having a wavelength of 514 mm from an Ar ion laser in the exposure for forming the blue element and by using a pattern mask provided with a window formed of a multiple film interference filter capable of transmitting selectively ray of 514 mm in wavelength. In this manner, a filter of red, green and blue type can be produced.

The foregoing description is made with reference to the use of the spot formed by condensing laser beam of high energy in transferring of the dye. However, energy ray having an energy sufficient for performing the transfer of dye may be employed even if the beam has an extended diameter. In this case, the whole surface of the pattern mask is irradiated with the extended energy beam at once, and each of red, green and blue color elements is formed by carrying out the irradiation one time for formation of each element. At that time, the f-θ lens and scanning system including the vibration mirror 34 and stand 44 are unnecessary.

The methods of fabricating a color filter by selective irradiation of the pattern mask with ray of a particular wavelength are explained with reference to FIGS. 9 and 13. As another method, there may be mentioned the following one. For example, at first, charging is carried out on the surface of an electrophotographic photosensitive member, and the surface is exposed to rays having different wavelengths sucessively through a pattern mask having windows capable of transmitting or reflecting rays having different wavelengths. Development is performed with toners of predetermined colors each time the irradiation is conducted, and as a result, red, green and blue element layers are formed on the surface of the photosensitive member. These color elements are then transferred to an appropriate transparent sheet, thereby producing a color filter.

What we claim is:

1. A process for fabricating, an electrical device including a solid pickup element with a plurality of sensors arranged in a pattern for converting two dimensional images into electrical signals and a color filter having color elements arranged in the form of a mosaic or stripe precisely located relative to the sensor pattern and disposed in a color element layer formed of said color elements on the solid pickup element, said process comprising:

registering the sensors of the solid pickup element with a pattern mask, having a pattern corresponding to the mosaic or stripe arrangement of color elements of the color filter, by aligning alignment marks carried respectively on the solid pickup element and on the pattern mask;

irradiating a layer of coloring matter disposed between the solid pickup element and the pattern mask with an energy beam modulated by the pattern mask, to melt or sublime the coloring matter; and applying selectively the coloring matter to the solid pickup element in accordance with said modulation to form the color element layer.

2. A process according to claim 1 in which the color element layer is formed by transferring coloring matter to a color element receiving layer on the solid pickup element.

3. A process according to claim 1 in which the pattern mask has energy ray intercepting portions that are reflective to the energy ray.

4. A process according to claim 1 in which the layer of coloring matter comprises coloring matters of colors different from each other in which the pattern mask has at least two kinds of window portions each of which passes or reflects an energy ray of a particular wavelength and the energy rays with wavelengths different from each other are modified so as to thereby apply selectively different coloring onto the solid pickup element by means of the energy rays having different wavelengths.

5. A process according to claim 4 in which one pattern mask has at least three kinds of windows for modifying at least three kinds of energy rays which have different wavelengths and correspond to at least red, green and blue coloring matters whereby red, green, and blue coloring matters are selectively applied to the solid pickup element by said applying step.

6. A process according to claim 1 in which a layer of the coloring matters to be applied is provided on the pattern mask.

7. A process for fabricating an electrical device including a solid pickup element with a plurality of sensors arranged in a pattern for converting two dimensional images into electrical signals and a color filter having a color element layer that includes color elements of colors different from each other disposed on the solid pickup element and precisely located relative to the sensor pattern, said process comprising:

registering the sensors of the solid pickup element with a pattern mask, having a pattern corresponding to the arrangement of different color elements of the color filter, by aligning alignment marks carried respectively on the solid pickup element and on the pattern mask; and irradiating a layer, disposed between the solid pickup element and the pattern mask, of coloring matters different from each other and corresponding to the different colors, with an energy beam modulated by the pattern mask and with a monitor beam to melt or sublime the coloring matters, thereby applying selectively the coloring matters onto the solid pickup element in accordance with the modulation, to form the color element layer, the modulation by the monitor beam being conducted by scanning the pattern mask with the monitor beam, detecting a reflecting beam of the monitor beam at the pattern mask surface and modulating the energy beam.

8. A process for fabricating an electrical device including a solid pickup element with a plurality of sensors arranged in a pattern for converting two dimensional images into electrical signals and a color filter having a color element layer that includes color elements of color different from each other disposed on the solid pickup element and precisely located relative to the sensor pattern, said process comprising:

providing a pattern mask in registration with the sensors of the solid pickup element and having at least two window portions that pass or reflect particular energy rays of wavelengths different from each other; and modulating an energy beam by the pattern mask to irradiate a layer disposed between the solid pickup element and the pattern mask of coloring matters different from each other and corresponding to the different colors with modulated energy rays, thereby applying selectively different coloring matters onto the solid pickup element by means of the energy rays having different wavelengths to produce the color element layer.

9. A process according to any one of claims 1, 9 or 8, in which the pattern mask is finely divided.

10. A process according to any one of claims 1, 9 or 8, in which dry coloring matter comprises the layer thereof.

11. A process according to any one of claims 1, 9 or 8, in which the energy beam is modulated by scanning across the pattern mask.

* * * * *

UNITED STATES PATENT AND TRADEMARK OFFICE
CERTIFICATE OF CORRECTION

PATENT NO. : 4,911,733

DATED : March 27, 1990

INVENTOR(S) : KAZUYA MATSUMOTO, ET AL.

It is certified that error appears in the above-identified patent and that said Letters Patent is hereby corrected as shown below:

COLUMN 1

Line 24, ""CD"" should read --"CCD"--.
Line 52, "be formed" should read --to be formed--.

COLUMN 2

Line 3, "forming," should read --forming--.
Line 19, "color matter" should read --coloring matter--.
Line 28, "color matter" should read --coloring matter--.
Line 32, "modification" should read --modulation--.

COLUMN 3

Line 47, "coloring member layer 7" should read --coloring matter layer 7--.

COLUMN 7

Line 6, "a" should be deleted.
Line 45, "a high" should read --high a--.

COLUMN 9

Line 8, "FIGS. 3-13." should read --FIGS. 8-13.--.
Line 44, "ocillation" should read --oscillation--.

COLUMN 10

Line 16, "sublia-" should read --sublima- --.
Line 21, "condensed" should read --is condensed--.

UNITED STATES PATENT AND TRADEMARK OFFICE
CERTIFICATE OF CORRECTION

PATENT NO. : 4,911,733

DATED : March 27, 1990

INVENTOR(S) : KAZUYA MATSUMOTO, ET AL.

It is certified that error appears in the above-identified patent and that said Letters Patent is hereby corrected as shown below:

COLUMN 10

Line 22, "imaging 32," should read --imaging lens 32,--.
Line 37, "micrometer 45" should read --micromotor 45-- (both occurrences).

COLUMN 12

Line 4, "fabricating," should read --fabricating--.

COLUMN 14

Line 15, "claims 1, 9 or 8," should read --claims 1, 7 or 8,--.
Line 17, "claims 1, 9" should read --claims 1, 7--.
Line 20, "claims 1, 9" should read --claims 1, 7--.

Signed and Sealed this

Twelfth Day of November, 1991

*Attest:*

HARRY F. MANBECK, JR.

*Attesting Officer*

*Commissioner of Patents and Trademarks*